(12) United States Patent
Moon

(10) Patent No.: US 9,922,316 B2
(45) Date of Patent: Mar. 20, 2018

(54) APPARATUS AND METHOD FOR PROVIDING PAYMENT SERVICE BASED ON BEACON IN BEACON SERVICE SYSTEM

(71) Applicant: SK Planet Co., Ltd., Gyeonggi-do (KR)

(72) Inventor: SeungHoon Moon, Seoul (KR)

(73) Assignee: SK PLANET CO., LTD., Seongnam-si, Gyeonggi-Do (KR)

( * ) Notice: Subject to any disclaimer, the term of this patent is extended or adjusted under 35 U.S.C. 154(b) by 0 days.

(21) Appl. No.: 15/002,045

(22) Filed: Jan. 20, 2016

(65) Prior Publication Data

US 2016/0275473 A1    Sep. 22, 2016

(30) Foreign Application Priority Data

Mar. 18, 2015    (KR) .......................... 10-2015-0037306

(51) Int. Cl.
*G06Q 20/20*     (2012.01)
*H04W 72/04*    (2009.01)
(Continued)

(52) U.S. Cl.
CPC ............ *G06Q 20/204* (2013.01); *G01S 1/042* (2013.01); *G01S 1/68* (2013.01); *G01S 11/06* (2013.01);
(Continued)

(58) Field of Classification Search
USPC .......................................................... 705/28
See application file for complete search history.

(56) References Cited

U.S. PATENT DOCUMENTS

2011/0068906 A1    3/2011    Shafer et al.
2011/0080264 A1    4/2011    Clare et al.
(Continued)

FOREIGN PATENT DOCUMENTS

WO    02/099758 A1    12/2002
WO    2014/176172 A2    10/2014

OTHER PUBLICATIONS

Extended European Search Report in European Patent Application No. 16151699.2, dated Apr. 22, 2016.
(Continued)

*Primary Examiner* — Garcia Ade
(74) *Attorney, Agent, or Firm* — Fenwick & West LLP

(57) ABSTRACT

An apparatus and method are proposed for providing a beacon-based payment service in a beacon service system including a point of sales (POS) device for payment and a user device using a beacon service application. The apparatus may include a beacon module configured to emit a beacon signal, and an input module configured to receive a user input for triggering the beacon-based payment service. The apparatus may further include a POS control unit configured to identify predetermined strength of a beacon signal when an event for triggering the beacon-based payment service occurs, to control emission of the beacon signal with the identified strength through the beacon module, to detect whether a user device accesses content regarding the emitted beacon signal, and to control retransmission of the beacon signal through the beacon module by increasing the strength of the beacon signal by a predetermined value if there is no access to the content.

2 Claims, 9 Drawing Sheets

(51) Int. Cl.
*G06Q 20/32* (2012.01)
*G01S 1/04* (2006.01)
*G01S 1/68* (2006.01)
*G01S 11/06* (2006.01)

(52) U.S. Cl.
CPC ....... *G06Q 20/327* (2013.01); *G06Q 20/3223* (2013.01); *H04W 72/046* (2013.01)

(56) References Cited

U.S. PATENT DOCUMENTS

| | | | |
|---|---|---|---|
| 2013/0217332 A1 | 8/2013 | Altman et al. | |
| 2015/0332240 A1* | 11/2015 | Harwood | G06Q 20/202 705/21 |
| 2016/0055474 A1* | 2/2016 | Syed | G06Q 20/325 705/39 |
| 2016/0077189 A1* | 3/2016 | Elias | G01S 5/0263 455/456.6 |

OTHER PUBLICATIONS

Dirk Liebich, "iBeacon and the future of shopping," retrieved Apr. 3, 2014, XP055262620 <http://upload-magazin.de/blog/8511-ibeacon-und-die-zukunft-des-einkaufens/>.

* cited by examiner

APPARATUS AND METHOD FOR PROVIDING PAYMENT SERVICE BASED ON BEACON IN BEACON SERVICE SYSTEM

CROSS-REFERENCE TO RELATED APPLICATION

This application claims priority to and the benefit of Korean Patent Application No. 10-2015-0037306 filed in the Korean Intellectual Property Office on Mar. 18, 2015, the entire contents of which are incorporated herein by reference.

TECHNICAL FIELD

The present invention relates to an apparatus and method for providing a beacon-based payment service in a beacon service system including a point of sales (POS) device for payment and a user device using a beacon service application.

BACKGROUND

Details disclosed herein merely offers background information regarding embodiments of this invention. No determination has been made, and no assertion is made, as to whether any of the below might be applicable as prior art with regard to the present invention.

The term "Internet of Things (IoT)" was first introduced at the MIT Auto-ID Labs in 1998. Thereafter, an annual report titled "The Internet of Things" was published at ITU-T in 2005 and preannounced that IoT would be the most fundamental frame containing all structures of future information technology (IT) industry revolution. This report defined IoT as "a new information communication infrastructure that connects all kinds of things existing in the world through networks and enables persons and things to communicate with one another anytime and anywhere". That is, IoT can be regarded as an infrastructure to realize a ubiquitous space. Such a ubiquitous space starts by implanting computing devices equipped with specific functions into environments and things and making the environment or the things intelligent.

An IoT service provides more convenient and safer life to us. Therefore, various mobile service providers and device manufacturers are focusing on development of IoT supportable devices and services emerging as a next generation mobile service. However, such IoT services are at an early stage and have not established a detailed model. Therefore, there is a need for a detailed method for providing such IoT services.

Meanwhile, a demand for offering a payment service based on IoT technology is now increasing. Also, a payment service today is often using a user device, e.g., a smart phone, which has a payment application. For example, when a user device such as a smart phone is touched on a point of sales (POS) device that is installed in a shop or store, a specific application for payment is invoked in the user device by means of near field communication (NFC) technology capable of exchanging data through bidirectional communication or beacon-based technology allowing periodic emission of signals.

Additionally, service providers install a beacon device in a shop or store and, based on beacon technology, offer various contents to a plurality of service users. In this case, service providers may offer various types of services such as a publicity booklet or pamphlet service, a discount coupon download service, a payment service, a game application download service, and the like.

However, since a beacon signal is normally transmitted to a plurality of user devices in a broad space rather than to a desired user device which resides in a specific location, beacon technology is not suitable for a payment service.

SUMMARY

Accordingly, in order to address the aforesaid or any other issue, the present invention provides an apparatus and method for a beacon-based payment service in a beacon service system by offering service content to only a user located within a short range from an apparatus for performing payment.

Additionally, the present invention provides a beacon-based service system, apparatus and method using a signature pad which is equipped in a card payment terminal and has a beacon function allowing a specific device to receive a beacon signal having directivity.

According various embodiments of the present invention, an apparatus for providing a beacon-based payment service may include a beacon module configured to emit a beacon signal, an input module configured to receive a user input for triggering the beacon-based payment service, and a POS (Point of Sales) control unit configured to identify predetermined strength of a beacon signal when an event for triggering the beacon-based payment service occurs, to control emission of the beacon signal with the identified strength through the beacon module, to detect whether a user device accesses content regarding the emitted beacon signal, and to control retransmission of the beacon signal through the beacon module by increasing the strength of the beacon signal by a predetermined value if there is no access to the content.

According various embodiments of the present invention, the POS control unit may be further configured to detect the access to the content by receiving access state information from a beacon service server when the user device accesses the beacon service server.

According various embodiments of the present invention, the above apparatus may further include a POS memory unit configured to store information for determining whether the event for triggering the beacon-based payment service occurs. In this case, the stored information may include information about an action of pressing a specific button of the input module, an action of touching, tapping, or clicking a specific spot of the input module, or an action of drawing a specific pattern on the input module.

According various embodiments of the present invention, the beacon module may be further configured to emit the beacon signal having directivity, and the POS control unit may be further configured to control the beacon module to emit the beacon signal in a predetermined direction so as to enhance reception sensibility of the user device.

According various embodiments of the present invention, a method for providing a beacon-based payment service may include steps of: at a beacon service apparatus, determining whether an event for triggering the beacon-based payment service occurs; at the beacon service apparatus, emitting an initial beacon signal having predetermined strength detectable within a given distance if it is determined that the event for triggering the beacon-based payment service occurs; at a user device, invoking a beacon service application when the initial beacon signal emitted by the beacon service apparatus is detected; at the user device, sending a request for access to content associated with the beacon signal to a beacon service server through the beacon service application; and at the user device, receiving payment-related content from the beacon service server so as to perform payment.

According various embodiments of the present invention, the above method may further include step of, at the beacon service server, when the request for access to content is received from the user device, transmitting a notification, to the beacon service apparatus, indicating that the user device accesses the content.

According various embodiments of the present invention, the above method may further include step of, at the beacon service apparatus, when the notification is received from the beacon service server, recognizing that the user device accesses the content associated with the emitted beacon signal.

According various embodiments of the present invention, the above method may further include step of, at the beacon service apparatus, emitting a next beacon signal having increased strength if there is no access to the content for a given time after emission of the initial beacon signal.

According various embodiments of the present invention, the emitting step of the next beacon signal may include checking periodically whether there is access to the content after the emission of the initial beacon signal, and increasing a signal emission level of the beacon signal by a predetermined strength value.

According various embodiments of the present invention, the determining step may include detecting an action of pressing a specific button of a signature pad equipped in the beacon service apparatus, an action of touching, tapping, or clicking a specific spot of the signature pad, or an action of drawing a specific pattern on the signature pad.

DETAILED DESCRIPTION

Figure 1:
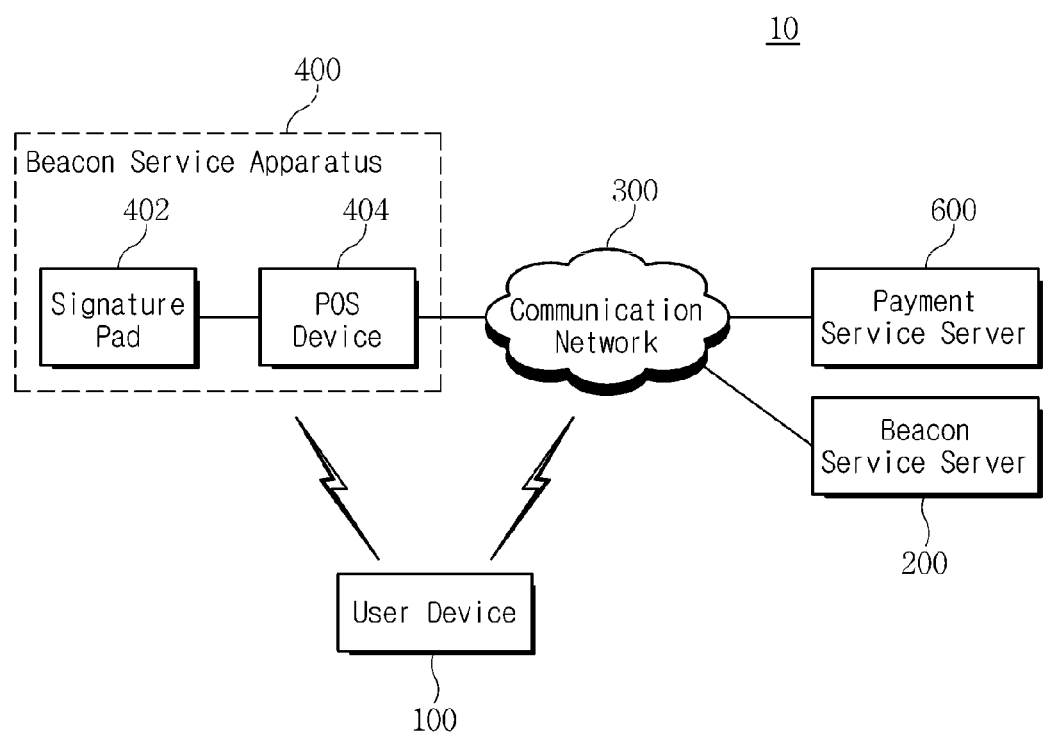
FIG. 1 is a schematic diagram illustrating a beacon service system according to an embodiment of the present invention.

Hereinafter, embodiments of the present invention will be described with reference to the accompanying drawings.

However, well known techniques may not be described or illustrated in detail to avoid obscuring the subject matter of the present invention. Through the drawings, the same or similar reference numerals denote corresponding features consistently.

The terms and words used in the following description and drawings are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

The expression "1", "2", "first", or "second" used in various embodiments of the present disclosure may modify various components of such embodiments but does not limit the corresponding components. For example, the above expressions do not limit the sequence and/or importance of the components but may be used for distinguishing one component from other components. For example, a first user device and a second user device indicate different user devices although both of them are user devices. For example, without departing from the scope of the present disclosure, a first structural element may be referred to as a second structural element. Similarly, the second structural element also may be referred to as the first structural element.

When it is stated that a component is "coupled to" or "connected to" another component, the component may be directly coupled or connected to another component or a new component may exist between the component and another component. In contrast, when it is stated that a component is "directly coupled to" or "directly connected to" another component, a new component does not exist between the component and another component.

The terms used in describing various embodiments of the present disclosure are only examples for describing a specific embodiment but do not limit the various embodiments of the present disclosure. Singular forms are intended to include plural forms unless the context clearly indicates otherwise. Unless defined differently, all terms used herein, which include technical terminologies or scientific terminologies, have the same meaning as that understood by a person skilled in the art to which the present disclosure belongs. The terms "include", "comprise", and "have" as well as derivatives thereof, mean inclusion without limitation.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as one or more data links (of possibly different speeds) that enable the transport of electronic data between computer systems and/or modules (e.g., hardware and/or software modules). When information is transferred or provided over a network or another communications connection (either hardwired, wireless, or a combination of hardwired or wireless) to a computer system, the connection is properly viewed as a computer-readable medium. Computer-executable instructions include, for example, instructions and data which cause a general-purpose computer system or special-purpose computer system to perform a certain function or group of functions. The computer executable instructions may be, for example, binaries, intermediate format instructions such as assembly language, or even source code.

Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

The present invention provides technique for a beacon-based payment service using a beacon service apparatus (also referred to as a payment terminal) which has therein a signature pad and a beacon module for emitting a beacon signal.

Normally a beacon service can benefit a lot of customers at one time through omnidirectional emission of signals, whereas such a beacon service fails to offer a payment function targeting a specific customer located near a payment terminal.

In order to obviate the above limitation, the present invention proposes a new scheme for initially emitting a beacon signal with low strength suitable for a short range service and then, depending on whether there is access of a user device, increasing the signal strength step by step so as to widen a coverage.

Further, proposed by this invention is to allow a beacon module equipped in a signature pad to emit a beacon signal having directivity in a predetermined direction so as to enhance reception sensibility of a user device which resides in that direction.

Now, a beacon service system, and elements thereof, for providing a beacon-based payment service according to an embodiment of the present invention will be described.

FIG. 1 is a schematic diagram illustrating a beacon service system according to an embodiment of the present invention.

Referring to FIG. 1, the beacon service system 10 according to an embodiment of this invention may be configured to include a user device 100, a beacon service server 200, a beacon service apparatus 400, and a payment service server 600. Additionally, a communication network 300 may be further included in the system 10 so as to support transmission and reception of information among the user device 100, the beacon service server 200, the beacon service apparatus 400, and the payment service sever 600.

Now, each element of the system 10 will be described with reference to FIG. 1.

The user device 100 is a user's terminal or apparatus capable of transmitting or receiving data via the communication network 300 in response to user's manipulation. The user device 100 may perform voice or data communication through the communication network 300 and transmit or receive information to or from the beacon service apparatus 400 through beacon-based communication. For this, the user device 100 may include a browser for transmission or reception of information, a memory for storing programs and protocols, a microprocessor for executing and controlling various programs, and the like.

The user device 100 may access an application provider (not shown), e.g., a so-called app store, connected to the communication network 300. Then the user device 100 may receive a beacon service application from the application provider and install the received beacon service application so as to support a beacon-based payment service.

In an embodiment, when a beacon signal emitted by the beacon service apparatus 400 is detected, the user device 100 invokes the beacon service application and then requests access to specific content offered by the beacon service server 200. Thereafter, the user device 100 receives the content from the beacon service server 200 and then performs payment.

Such a beacon-based payment service of the user device 100 will be described below in detail with reference to FIGS. 2 and 3.

The user device 100 may be implemented in various forms. For example, the user device 100 disclosed herein may be a mobile device such as a smart phone, a tablet PC, a PDA (Personal Digital Assistant), a PMP (Portable Multimedia Player), an MP3 player, and the like, or a stationary device such as a smart TV, a desktop computer, and the like.

Additionally, according to a recent trend of convergence in digital devices, a great variety of mobile devices or their equivalences may be used as the user device 100 in the present invention. Furthermore, any device that allows a beacon service application to be downloaded and installed may be used as the user device 100 in embodiments of this invention.

The beacon service apparatus 400 is configured to include a signature pad 402 and a POS (Point of Sales) device 404.

The signature pad 402 has a beacon module for performing a beacon function. Also, the signature pad 402 transmits a beacon signal through the beacon module under the control of the POS device 404.

Figure 10:
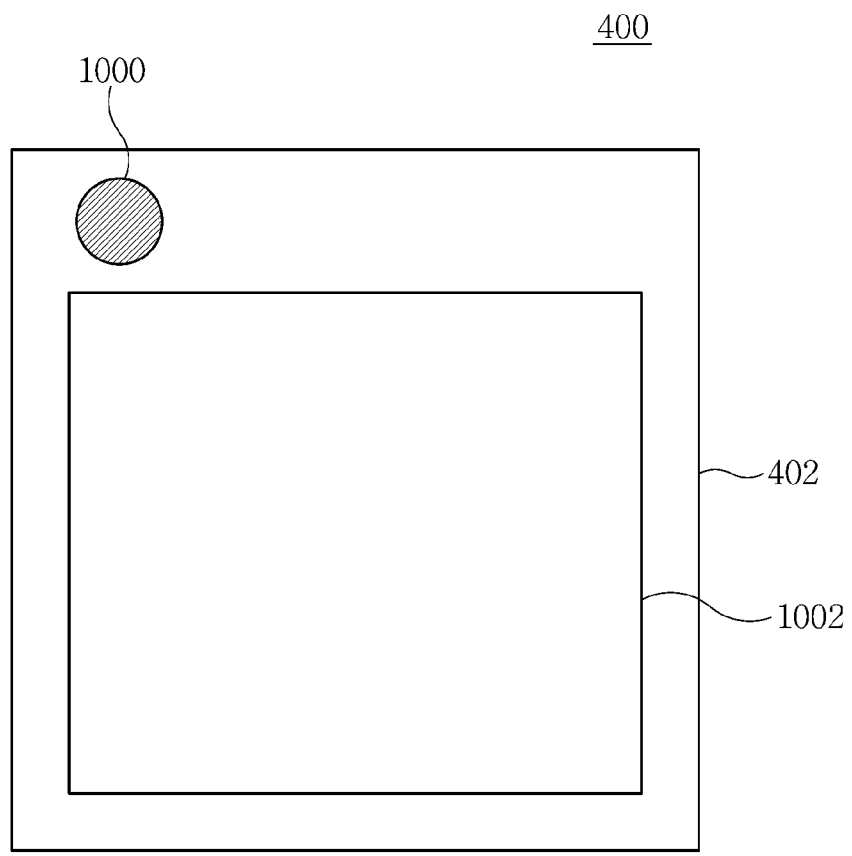
FIG. 10 is a schematic diagram illustrating an example of a signature pad having a beacon module according to an embodiment of the present invention.

FIG. 10 shows the outward appearance of the signature pad 402. Referring to FIG. 10, the signature pad 402 may include a beacon payment button 1000 for triggering a beacon-based payment service. When this button 1000 is pressed or selected, the signature pad 402 delivers a button input signal to the POS device 404. Additionally, when a predetermined pattern is entered through an input region 1002, the signature pad 402 delivers a corresponding input signal to the POS device 404.

There are two embodiments of detecting an event for triggering a beacon-based service.

In the first embodiment, a beacon-based service may be triggered when the beacon payment button 1000 of the signature pad 402 is pressed or selected.

In the second embodiment, a beacon-based service may be triggered in response to a predetermined event detected from the input region 1002 of the signature pad 402. This predetermined event refers to an input of a predefined specific pattern such as a double press on the center of the input region 1002 or double marking of X shape on the input region 1002.

Returning to FIG. 1, the POS device 404 communicates with the user device 100, the beacon service server 200, and the payment service server 600 through the communication network 300 and transmits or receives data applied to payment using beacon.

Particularly, when an input signal received from the signature pad 402 indicates an event for triggering a beacon-based service, the POS device 404 emits a beacon signal through the beacon module of the signature pad 402. At this time, the initial beacon signal has enough strength to arrive at the user device 100 through short range communication. This signal strength is predetermined.

Then the POS device 404 checks whether the user device 100 tries access. If there is no try for access within a predetermined time, the POS device 404 increases the strength of a beacon signal and then emits the signal. This process may be repeated several times.

For example, a beacon signal emitter of the signature pad 402 may emit a payment service beacon signal having strength suitable for being detectable only within a short range, e.g., about 30 cm, so as to offer content for a payment service to the user device 100 that resides near the signature pad 402.

For example, if the user device 100 fails to access such content for a given time, e.g., three seconds, after the emission of an initial signal having the lowest strength, the POS device 404 may emit the next beacon signal having increased strength.

Elements and operations of the user device 100 and the beacon service apparatus 400 will be described below. A processor equipped in each of the user device 100 and the beacon service apparatus 400 may process program commands for performing a method of this invention. This processor may be a single-threaded processor or a multi-threaded processor. Also, this processor may process commands stored in a memory or storage.

The communication network 300 may establish a communication channel for delivery of data and signals between respective elements of the beacon service system 10. Namely, the communication network 300 may establish communication channels with the user device 100, the beacon service apparatus 400, the payment service server 600, and the beacon service server 200 and also support transmission and reception of data among them.

The communication network 300 may use wireless communication technique such as, but not limited to, WLAN (Wireless Local Access Network), Wi-Fi, Wibro, Wimax, HSDPA (High Speed Downlink Packet Access), or the like. Alternatively or additionally, depending on system types, the communication network 300 may use wired communication technique such as Ethernet, xDSL (ADSL, VDSL), HFC (Hybrid Fiber Coaxial cable), FTTC (Fiber To The Curb), FTTH (Fiber To The Home), or the like.

Additionally, the communication network 300 includes a plurality of access networks (not shown) and a core network (not shown), and may further include an external network, e.g., Internet (not shown). Here, the access network is to perform wired/wireless communication with the user device 100 and may be formed of a plurality of base stations, also referred to as BTS (Base Transceiver Station), NodeB, or eNB (eNodeB or evolved Node B), and controllers such as BSC (Base Station Controller) and RNC (Radio Network Controller). Additionally, instead of such a base station that includes a digital signal processor and a radio signal processor, a plurality of radio units (not shown) corresponding to the radio signal processor may be disposed respectively at a plurality of regions and connected to a centralized digital unit (not shown) corresponding to the digital signal processor.

The core network which forms a mobile network together with the access network performs a function to connect the access network and the external network such as Internet.

The core network is a network system that performs main functions for a mobile communication service such as mobility control and switching between the access networks. Namely, the core network performs circuit switching or packet switching and further manages and controls a packet flow in the mobile network. In addition, the core network may manage mobility between frequencies, control traffic therein and in the access network, and control interworking with other network such as Internet. The core network may be formed of SGW (Serving GateWay), PGW (PDN GateWay), MSC (Mobile Switching Center), HLR (Home Location Register), MME (Mobile Mobility Entity), HSS (Home Subscriber Server), and/or the like.

The Internet is a world common network through which information is exchanged according to TCP/IP protocol. The Internet is connected to the beacon service server 200 and the payment service server 600 and may deliver information, offered from the beacon service server 200 and the payment service server 600, to the user device 100 and the beacon service apparatus 400 through the core network and the access network. Similarly, the Internet may deliver information, offered from the user device 100 and the beacon service apparatus 400, to the beacon service server 200 and the payment service server 600 through the core network and the access network. This is, however, exemplary only and not to be construed as a limitation. Alternatively, the beacon service server 200 and the payment service server 600 may be integrated with the core network.

In addition to the above-discussed communication technique, any other communication technique well known in the art or to be developed may be used for this invention.

Hereinbefore, the beacon service system according to an embodiment of this invention is described.

Now, the user device 100 according to an embodiment of this invention will be described with reference to FIGS. 2 and 3.

Figure 2:
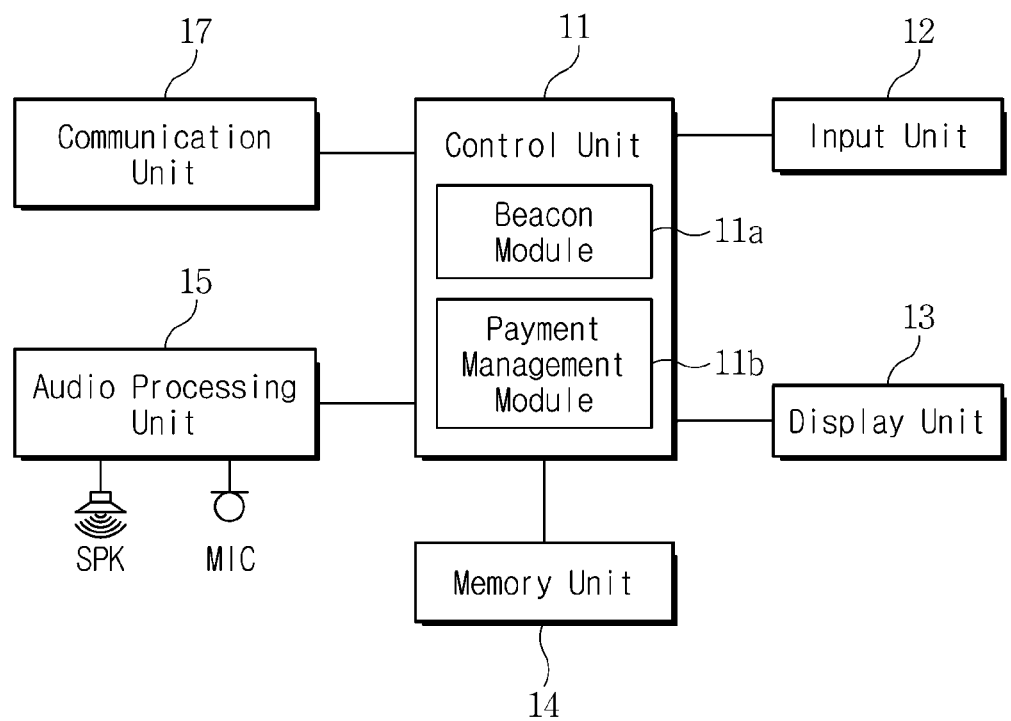
FIG. 2 is a block diagram illustrating main elements of a user device according to an embodiment of the present invention.

FIG. 2 is a block diagram illustrating main elements of a user device according to an embodiment of the present invention. FIG. 3 is a block diagram illustrating main elements of a user device in view of functionality according to an embodiment of the present invention.

Referring to FIG. 2, the user device 100 includes a control unit 11, an input unit 12, a display unit 13, a memory unit 14, an audio processing unit 15, and a communication unit 17. The control unit 11 includes a beacon module 11a and a payment management module 11b.

The input unit 12 is configured to receive user's manipulation for entering various kinds of information and setting or controlling various functions of the user device 100, to create a corresponding input signal, and to deliver the input signal to the control unit 11. The input unit 12 may include a keypad and/or a touch pad. The input unit 12 formed of a touch panel may be integrated with the display unit 13 formed of a display panel to constitute a touch screen. The input unit 12 may use various input mechanisms such as a keyboard, a mouse, a joystick, a jog wheel, a touch-sensitive member, a gesture or image detection member, a voice recognition member, and the like. In an embodiment, the input unit 12 creates an input signal for payment in response to a user's input action, gesture or manipulation and then delivers the payment input signal to the control unit 11.

The display unit 13 is configured to visually offer various kinds of information received or created during the operation of the user device 100. For example, the display unit 13 may displays thereon a menu, user data, operating status, operating results, and the like. The display unit 13 may be formed of LCD (Liquid Crystal Display), TFT-LCD (Thin Film Transistor LCD), LED (Light Emitting Diode), OLED (Organic LED), AMOLED (Active Matrix OLED), retina display, flexible display, three-dimensional display, and the like. In an embodiment, the display unit 13 outputs a specific screen for executing a beacon service application.

The memory unit 14 including a main memory unit and an auxiliary memory unit is configured to store an operating system, programs, applications and data required for the operation of the user device 100. The memory unit 14 may be formed of a program region and a data region. When a user's request for a particular function of the user device 100, the control unit 11 retrieves a suitable program or application from the memory unit 14 and then executes the program or application to offer the requested function. In an embodiment, the memory unit 14 stores a program for checking beacon, a beacon service application, and the like.

The audio processing unit 15 is configured to process an audio signal received from a microphone (MIC) or to be transmitted to a speaker (SPK). Namely, the audio processing unit 15 may convert an audio signal of an analog form, entered through the microphone, into a digital form and then deliver it to the control unit 11. Also, the audio processing unit 15 may convert an audio signal of a digital form, outputted from the control unit 11, into an analog form and then output it through the speaker. In an embodiment, the audio processing unit 15 outputs sound effects associated with the execution of a beacon service application.

The communication unit 17 is configured to transmit or receive data for a payment service through the communication network 300. The communication unit 17 may include an RF (Radio Frequency) transmitter which up-converts the frequency of an outgoing signal and then amplifies the signal, and an RF receiver which amplifies with low-noise an incoming signal and down-converts the frequency of the signal. The communication unit 17 may include at least one wireless communication module (not shown) and/or at least one wired communication module (not shown). The wireless communication module may include a radio communication module, a WLAN communication module, and/or a WPAN (Wireless Personal Area Network) communication module such as a Bluetooth module, a UWB (Ultra Wide Band) module, or a Zigbee module. The wireless communication module may transmit or receive data to or from the beacon service apparatus 400 and the beacon service server 200. Additionally, the wired communication module may access the communication network 300 and then transmit or receive data to or from the beacon service apparatus 400 and the beacon service server 200. In an embodiment, while communicating with the beacon service apparatus 400 and the beacon service sever 200, the communication unit 17 transmits or receives data for providing a beacon-based payment service.

The control unit 11 is configured to control the operations of the user device 100. The control unit 11 may be a processor for controlling the operating system and elements of the user device 100. In an embodiment, when a beacon signal emitted by the beacon service apparatus 400 is detected, the control unit 11 invokes a beacon service application and then requests access to specific content offered by the beacon service server 200. Thereafter, the control unit 11 receives the content from the beacon service server 200 and then performs payment.

Figure 3:
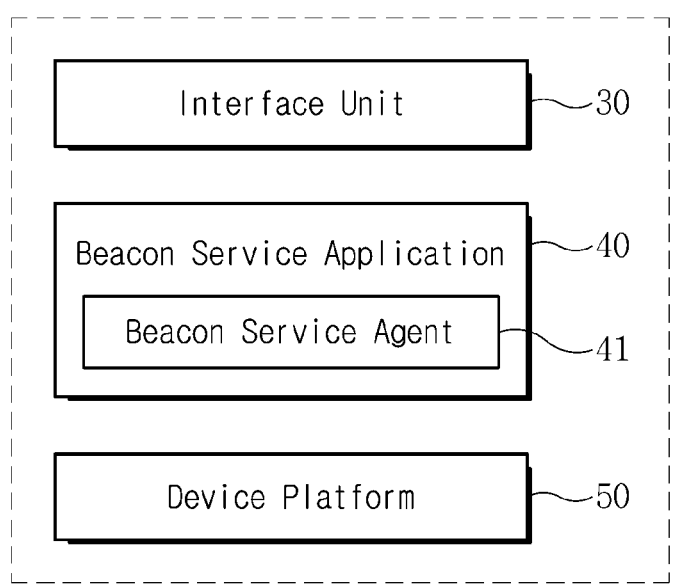
FIG. 3 is a block diagram illustrating main elements of a user device in view of functionality according to an embodiment of the present invention.

Referring to FIG. 3, the user device 100 may be configured to include an interface unit 30, a beacon service application 40 including a beacon service agent 41, and a device platform 50.

The interface unit 30 is configured to perform communication with the beacon service apparatus 400 and the beacon service server 200.

The beacon service application 40 may be installed by an installation module (not shown) according to installation information offered by an application provider (not shown), e.g., a so-called app store. Alternatively, the beacon service application 40 may be installed as one of default applications at the manufacture of the device 100.

The beacon service application 40 may be offered on the display unit 13 in the form of an icon. When this icon is selected by a user or when a beacon signal is received from the beacon service apparatus 400, the device platform 50 invokes the beacon service application 40 from the memory unit 14. At this time, the device platform 50 not only processes a signal associated with the invocation of the beacon service application 40, but also outputs a related screen to the display unit 13. In case of an application that needs a communication function, the device platform 50 may activate the communication unit 17.

When the beacon service application 40 is invoked by the device platform 50, the beacon service agent 41 requests the access to specific content offered by the beacon service server 200. Thereafter, the beacon service agent 41 receives the content from the beacon service server 200 and then performs payment.

The device platform 50 is an element for processing a signal or a routine and controlling data storing and transmission so as to support various functions of the user device 100. The device platform 50 may use iOS, Mac OS, Android OS, or any other equivalent.

Hereinbefore, the user device 100 according to an embodiment of this invention is described.

Now, the beacon service apparatus 400 according to an embodiment of this invention will be described with reference to FIGS. 4 and 5.

Figure 4:
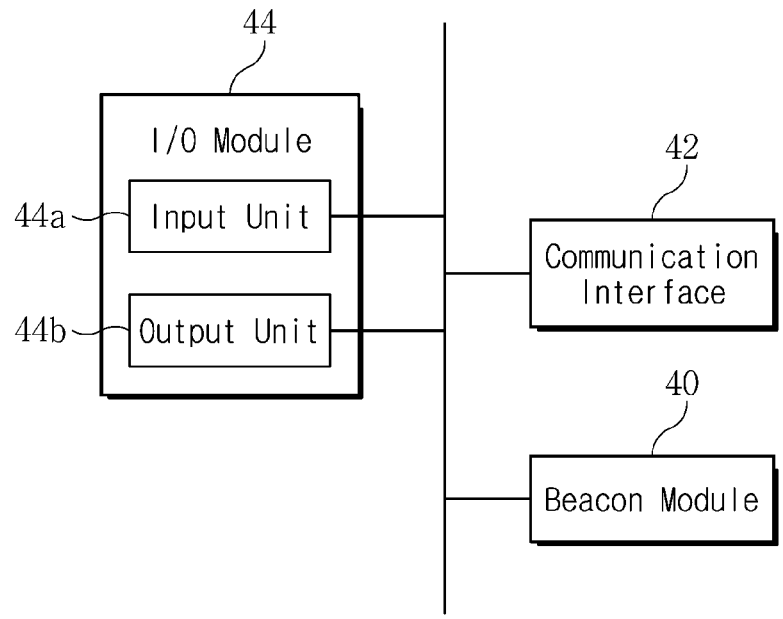
FIG. 4 is a block diagram illustrating main elements of a signature pad according to an embodiment of the present invention.

FIG. 4 is a block diagram illustrating main elements of a signature pad according to an embodiment of the present invention.

FIG. 4 shows elements of the signature pad 402 in view of functionality according to an embodiment discussed earlier with reference to FIG. 1.

Referring to FIGS. 1 and 4, the signature pad 402 may be configured to include a beacon module 40, a communication interface 42, and an input/output module 44.

Each element according to an embodiment of the present invention may be implemented in the form of a module. In this disclosure, the term "module" may refer to a component or device which is formed of software, hardware, or combination thereof, and performs certain tasks. A module may be configured to reside on an addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

The beacon module 40 is configured to transmit a beacon signal so as to provide a beacon-based service.

The beacon module 40 emits a beacon signal having predetermined initial strength through the communication interface 42 when a predetermined input event for triggering a payment service occurs in an idle state. This input event may be a press or selection of a beacon payment button (e.g., 1000 in FIG. 10) through the input unit 44a or an input of a predefined specific pattern on the input unit 44a, for example, a double press on the center of the input unit 44a or double marking of X shape on the input unit 44a.

The communication interface 42 is configured to support a communication function of the signature pad 402.

The communication interface 42 may support the establishment of a communication channel between the signature pad 402 and the communication network 300. The communication interface 42 may be designed in a suitable form for transmitting or receiving data to or from the communication network 300 having a specific communication type such as LTE, 3G WLAN, Wi-Fi, and the like. Further, the communication interface 42 may support data transmission/reception between user devices having different communication types.

When access from the user device 100 is detected, the communication interface 42 notifies this to the POS device 404.

Figure 5:
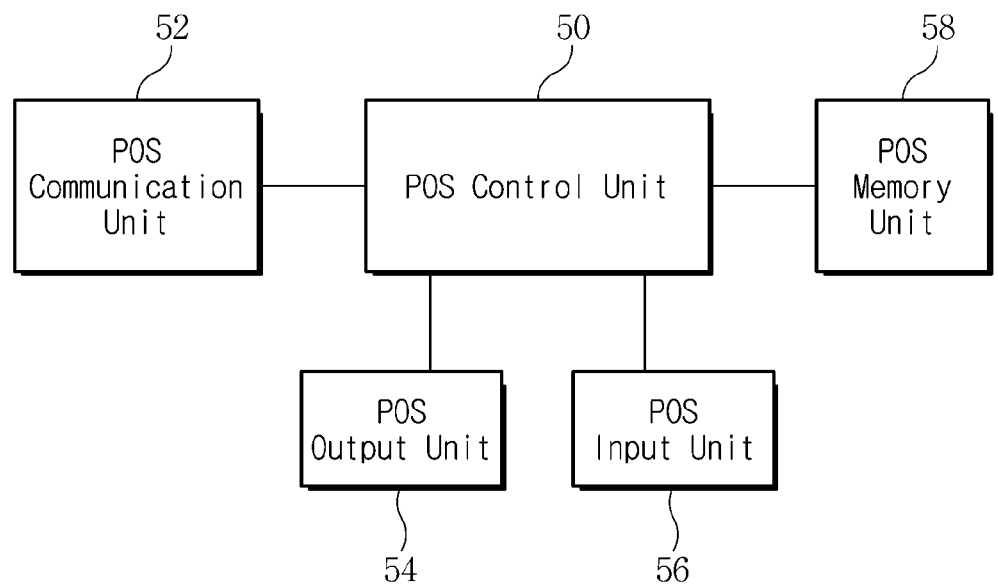
FIG. 5 is a diagram illustrating main elements of a POS device according to an embodiment of the present invention.

FIG. 5 is a diagram illustrating main elements of a POS device according to an embodiment of the present invention.

Referring to FIG. 5, the POS device 404 is configured to include a control unit 50 (hereinafter referred to as a POS control unit), a communication unit 52 (hereinafter referred to as a POS communication unit), an output unit 54 (hereinafter referred to as a POS output unit), an input unit 56 (hereinafter referred to as a POS input unit), and a memory unit 58 (hereinafter referred to as a POS memory unit).

The POS communication unit 52 is configured to transmit or receive data for a payment service through the communication network 300. The POS communication unit 52 may include an RF transmitter which up-converts the frequency of an outgoing signal and then amplifies the signal, and an RF receiver which amplifies with low-noise an incoming signal and down-converts the frequency of the signal. The POS communication unit 52 may include at least one wireless communication module (not shown) and/or at least one wired communication module (not shown). The wireless communication module may include a radio communication module, a WLAN communication module, and/or a WPAN communication module such as a Bluetooth module, a MB module, or a Zigbee module. The wireless communication module may transmit or receive data to or from the payment service server 600 and the beacon service server 200. Additionally, the wired communication module may access the communication network 300 and then transmit or receive data to or from the payment service server 600 and the beacon service server 200. In an embodiment, while communicating with the payment service server 600 and the beacon service sever 200, the POS communication unit 52 transmits or receives data for providing a beacon-based payment service.

The POS input unit 56 is configured to receive user's manipulation for entering various kinds of information and setting or controlling various functions of the POS device 404, to create a corresponding input signal, and to deliver the input signal to the POS control unit 50. The POS input unit 56 may include a keypad and/or a touch pad. The POS input unit 56 formed of a touch panel may be integrated with the POS output unit 54 formed of a display panel to constitute a touch screen. The POS input unit 56 may use various input mechanisms such as a keyboard, a mouse, a joystick, a jog wheel, a touch-sensitive member, a gesture or image detection member, a voice recognition member, and the like.

The POS output unit 54 may be formed of a display unit and an audio processing unit. The display unit of the POS output unit 54 is configured to visually offer various kinds of information received or created during the operation of the POS device 404. For example, the display unit of the POS output unit 54 may displays thereon a menu, user data, operating status, operating results, and the like. The display unit of the POS output unit 54 may be formed of LCD, TFT-LCD, LED, OLED, AMOLED, retina display, flexible display, three-dimensional display, and the like. In an embodiment, the display unit of the POS output unit 54 outputs data for a beacon-based payment service.

The audio processing unit of the POS output unit 54 is configured to process an audio signal received from a microphone or to be transmitted to a speaker. Namely, the audio processing unit of the POS output unit 54 may convert an audio signal of an analog form, entered through the microphone, into a digital form and then deliver it to the POS control unit 50. Also, the audio processing unit of the POS output unit 54 may convert an audio signal of a digital form, outputted from the POS control unit 50, into an analog form and then output it through the speaker.

The POS memory unit 58 including a main memory unit and an auxiliary memory unit is configured to store an operating system, programs, applications and data required for the operation of the POS device 404. The POS memory unit 58 may be formed of a program region and a data region. When a user's request for a particular function of the POS device 404, the POS control unit 58 retrieves a suitable program or application from the POS memory unit 58 and then executes the program or application to offer the requested function. In an embodiment, the POS memory unit 58 stores a program for providing a beacon-based payment service, conditions for detecting an event for triggering a beacon-based payment service, and information about transmission strength of a beacon signal. Here, the transmission strength information regarding a beacon signal may include information about the initial strength of a beacon signal and information about increases in signal strength. The POS memory unit 58 may further store information about a time interval for detecting the access of the user device 100 after a beacon signal is emitted. For example, if a time interval is set to three seconds, and if there is no access of the user device 100 for three seconds after emission of a beacon signal, this beacon signal increases in strength by a predetermined value and then is emitted again.

The POS control unit 50 is configured to control the operations of the POS device 404. The POS control unit 50 may be a processor for controlling the operating system and elements of the POS device 404.

In an embodiment, when any event for triggering a beacon-based payment service occurs at the signature pad 402, the POS control unit 50 identifies a predetermined strength of a beacon signal and controls the emission of the beacon signal with the identified strength through the beacon module of the signature pad 402. Then the POS control unit 50 detects whether there is access of the user device 100 to content regarding the emitted beacon signal. If there is no access to content, the POS control unit 50 increases the strength of a beacon signal by a predetermined value and controls the retransmission of the beacon signal through the beacon module of the signature pad 402.

Although it is described in the above embodiment that the beacon module is equipped in the signature pad 402, the beacon module may be alternatively equipped in the POS device 404. In this case, the beacon module 400 shown in FIG. 4 and a button for triggering a beacon-based payment service may be included in the POS device 404.

Hereinbefore, the signature pad 402 and the POS device 400 which constitute the beacon service apparatus 400 according an embodiment of this invention is described.

Now, a method for providing a beacon-based payment service at the beacon service system according to an embodiment of this invention will be described with reference to FIGS. 6 to 10.

First, a signal flow delivered among the user device 100, the beacon service apparatus 400, and the payment service server 600 so as to provide a beacon-based payment service at the beacon service system will be described with reference to FIG. 6.

Figure 6:
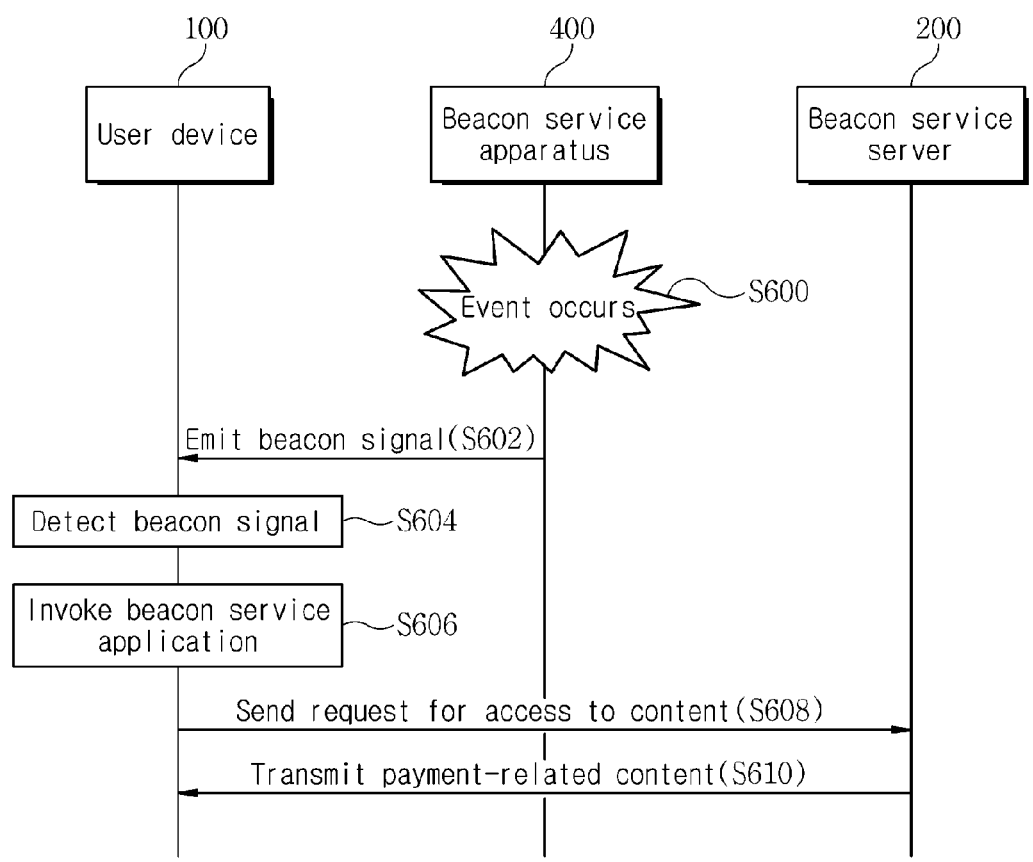
FIG. 6 is a diagram illustrating a signal flow for providing a beacon-based payment service between devices according to an embodiment of the present invention.

FIG. 6 is a diagram illustrating a signal flow for providing a beacon-based payment service between devices according to an embodiment of the present invention. Herein, the beacon service apparatus 400 includes the signature pad 402 and the POS device 404, and the beacon module may be mounted at either the signature pad 402 or the POS device 404.

Referring to FIG. 6, when any event for triggering a beacon-based payment service occurs at step S600, the beacon service apparatus 400 emits a beacon signal at step S602. Conditions regarding such events for triggering a beacon-based payment service are predetermined.

The event conditions may be a press or selection of a beacon payment button of the signature pad 402 or the POS device 404, or an input of a predefined specific pattern on the input unit of the signature pad 402, for example, a double press on the center of the input unit or double marking of X shape on the input unit. If the beacon module is equipped in the POS device 404, the event conditions may be set by means of specific numbers entered through the POS input unit of the POS device 404. Namely, an event for triggering a beacon-based payment service may include an action of pressing a specific button of the signature pad, an action of touching, tapping, or clicking a specific spot of the signature pad, or an action of drawing a specific pattern (e.g., signature) on the signature pad.

If the beacon signal emitted at step S602 is the initial beacon signal, this emission is performed at specific signal strength detectable only within a given distance. This strength of the initial beacon signal is predetermined and stored in the beacon service apparatus 400.

If the beacon signal emitted for a beacon-based payment service by the beacon service apparatus 400 is the initial beacon signal, this signal is emitted at the lowest strength. Thereafter, the beacon service apparatus 400 checks periodically whether there is user's access to content after emission of the beacon signal. If there is access to content, the beacon service apparatus 400 stops the emission of the beacon signal. If there is no access to content for a given time, the beacon service apparatus 400 increases a signal emission level by a predetermined strength value and then emits such a stronger beacon signal.

The user device 100 detects the beacon signal emitted by the beacon service apparatus 400 at step S604 and invokes a beacon service application at step S606.

Then, using the beacon service application, the user device 100 sends a request for access to specific content to the beacon service server 200 at step S608.

The beacon service server 200 that receives a content access request may notify the beacon service apparatus 400 that the user device 100 accesses the content.

Thereafter, at step S610, the beacon service server 200 transmits payment-related content to the user device 100 so that the user device 100 can use a beacon-based payment service.

Figure 7:
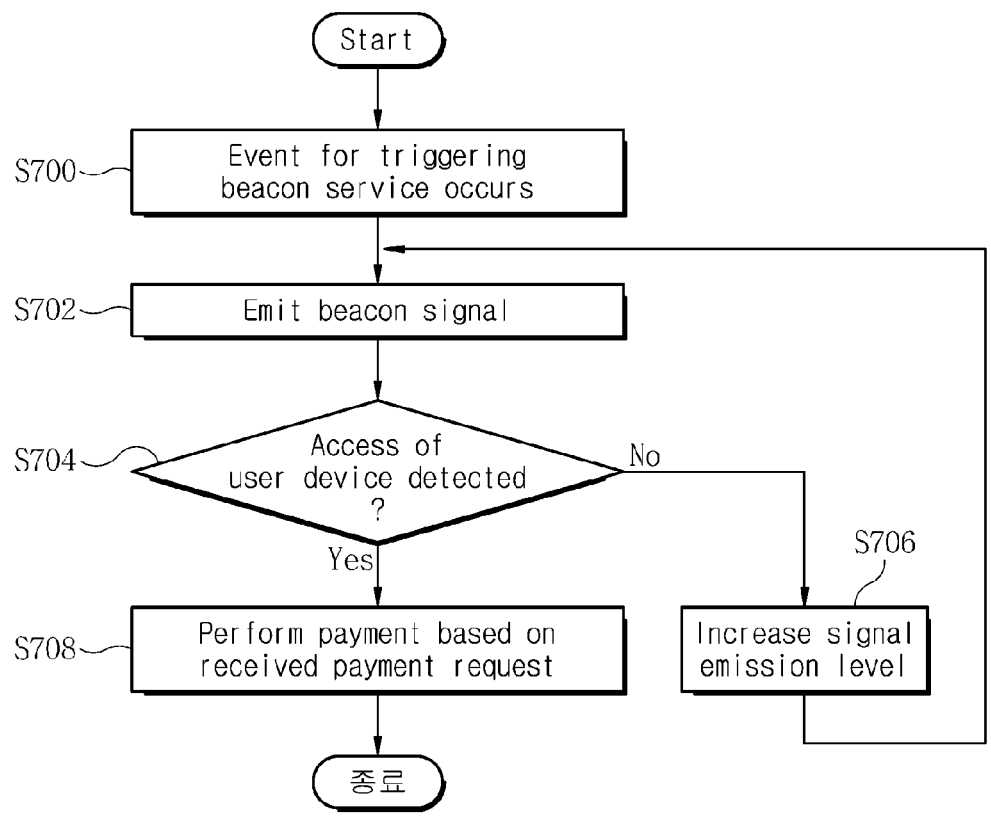
FIG. 7 is a flow diagram illustrating a method for performing a payment service at a beacon service apparatus having a beacon module according to an embodiment of the present invention.

FIG. 7 is a flow diagram illustrating a method for performing a payment service at a beacon service apparatus having a beacon module according to an embodiment of the present invention.

Referring to FIG. 7, when any event for triggering a beacon-based payment service occurs at step S700, the beacon service apparatus 400 emits a beacon signal at step S702.

This event for triggering a beacon-based payment service may include an action of pressing a specific button of the signature pad, an action of touching, tapping, or clicking a specific spot of the signature pad, or an action of drawing a specific pattern (e.g., signature) on the signature pad.

If the initial beacon signal is emitted at step S702, this emission is performed at specific signal strength detectable only within a given distance. This strength of the initial beacon signal is predetermined and stored in the beacon service apparatus 400.

For example, let's suppose that the beacon module is equipped in the signature pad of the beacon service apparatus 400 and that the strength of the initial beacon signal is set to be detectable only within a short range, e.g., about 30 cm, from the beacon module. In this case, the signature pad may emit a beacon signal having strength capable of arriving at only specific customers who reside within such a short range.

If there is no access to content associated with the beacon signal emitted for a beacon-based payment service for a given time, e.g., three seconds, after the emission of the beacon signal, the beacon service apparatus 400 may emit again a stronger beacon signal. Meanwhile, based on location recognition technology using received signal strength of the user device 100, such a beacon signal may be emitted with signal strength so as to arrive at only the nearest customer from the signature pad At step S704, the beacon service apparatus 400 checks whether the user device 100 accesses the content associated with the emitted beacon signal. If there is no access, the beacon service apparatus 400 increases a signal emission level by a predetermined strength value at step S706 and then emits again a stronger beacon signal at step S702.

However, if there is access of the user device 100, the beacon service apparatus 400 stops the emission of the beacon signal at step S708. Also, at this step, the beacon service apparatus 400 receives a payment request from the beacon service server 200 and performs payment based on the received request.

Figure 8:
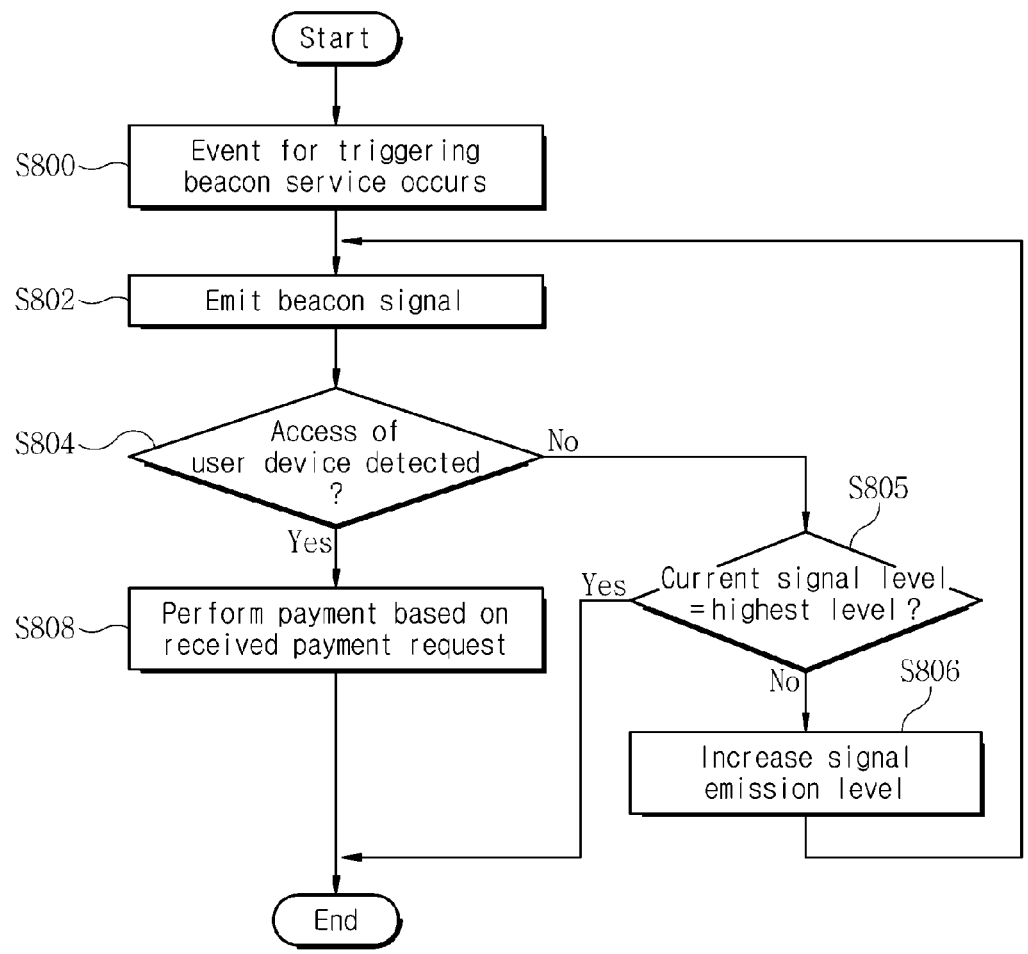
FIG. 8 is a flow diagram illustrating a method for performing a payment service at a beacon service apparatus having a beacon module according to another embodiment of the present invention.

FIG. 8 is a flow diagram illustrating a method for performing a payment service at a beacon service apparatus having a beacon module according to another embodiment of the present invention.

Referring to FIG. 8, when any event for triggering a beacon-based payment service occurs at step S800, the beacon service apparatus 400 emits a beacon signal at step S802. This event for triggering a beacon-based payment service may include an action of pressing a specific button of the signature pad, an action of touching, tapping, or clicking a specific spot of the signature pad, or an action of drawing a specific pattern (e.g., signature) on the signature pad.

If the initial beacon signal is emitted at step S802, this emission is performed at specific signal strength detectable only within a given distance. This strength of the initial beacon signal is predetermined and stored in the beacon service apparatus 400.

If there is no access to content associated with the beacon signal emitted for a beacon-based payment service for a given time, e.g., three seconds, after the emission of the beacon signal, the beacon service apparatus 400 may emit again a stronger beacon signal. Meanwhile, based on location recognition technology using received signal strength of the user device 100, such a beacon signal may be emitted with signal strength so as to arrive at only the nearest customer from the signature pad At step S804, the beacon service apparatus 400 checks whether the user device 100 accesses the content associated with the emitted beacon signal.

If there is no access, the beacon service apparatus 400 further checks at step S805 whether the strength of a current beacon signal is the highest emission level.

In case of the highest emission level, the beacon service apparatus 400 stops the emission of the beacon signal.

However, if the strength of a current beacon signal is not the highest emission level, the beacon service apparatus 400 increases a signal emission level by a predetermined strength value at step S806 and then emits again a stronger beacon signal at step S802.

Meanwhile, if there is access of the user device 100 at step S804, the beacon service apparatus 400 stops the emission of the beacon signal at step S808. Also, at this step, the beacon service apparatus 400 receives a payment request from the beacon service server 200 and performs payment based on the received request.

Figure 9:
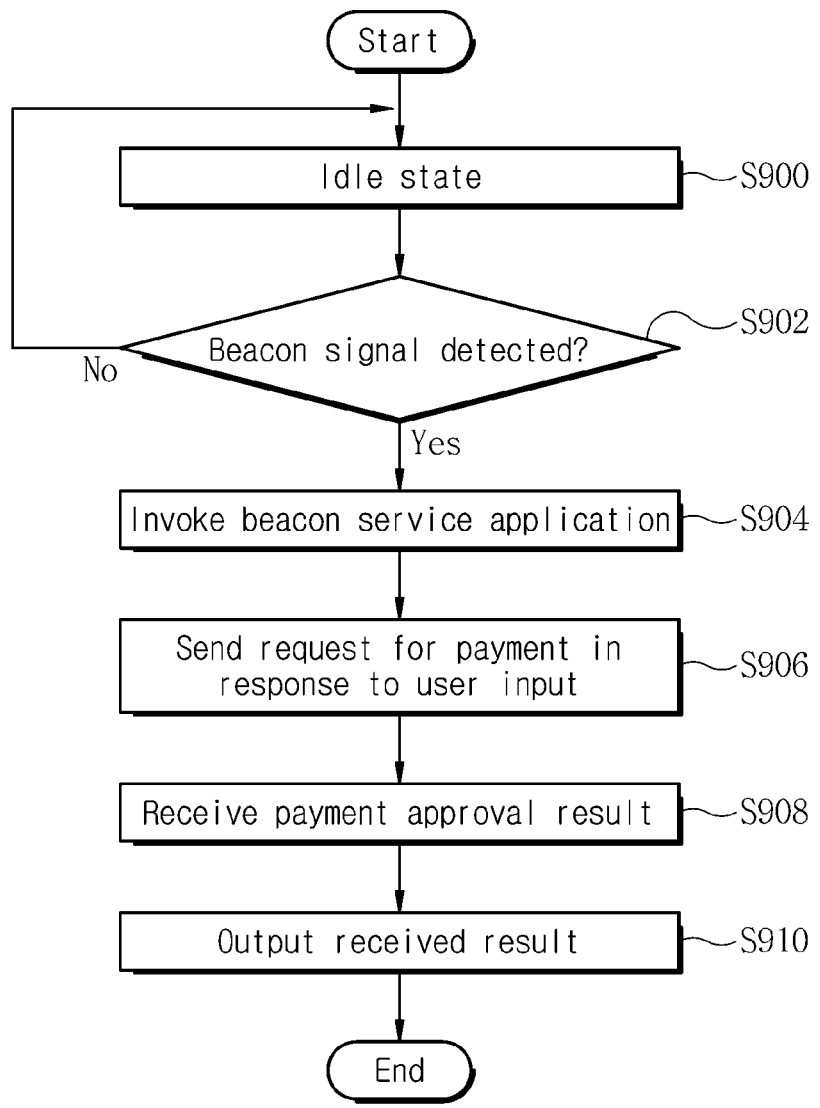
FIG. 9 is a flow diagram illustrating a method for performing a payment service at a user device through a beacon service apparatus according to an embodiment of the present invention.

FIG. 9 is a flow diagram illustrating a method for performing a payment service at a user device through a beacon service apparatus according to an embodiment of the present invention.

Referring to FIG. 9, the user device 100 which is in an idle state at step S900 detects a beacon signal at step S902 and then triggers a beacon service application at step S904.

Thereafter, if a user's input for payment is entered through the beacon service application, the user device 100 receives content for payment from the beacon service server 200 and sends a request for payment on the basis of the received content to the beacon service server 200 at step S906. Then the user device 100 receives the result of payment approval at step S908 and outputs the received result on the screen at step S910.

Hereinbefore, a method for providing a beacon-based payment service at the beacon service system according to an embodiment of this invention is described.

The above-discussed method according to an embodiment of this invention may be provided in the form of computer-readable medium suitable for storing program commands and data.

Additionally, a program stored in such a recording medium may execute the above-discussed functions or operations by being read, installed and executed in a computer.

In order for a computer to read a program recorded in a recording medium and execute functions formed of program, such a program may include codes written in computer languages such as C, C++, Java, machine language, etc. which can be read by a processor (CPU) of the computer through a machine interface of the computer.

According to various embodiments, at least part of the device, apparatus, server, or method according to the present disclosure may be implemented by a command stored in a non-transitory computer-readable storage medium in a programming module form. When the command is executed by one or more processors, the one or more processors may execute a function corresponding to the command. The non-transitory computer-readable storage medium may be, for example, a memory unit or a storage unit. At least a part of the programming module may be implemented (e.g., executed) by, for example, the processor. At least a part of the programming module may include, for example, a module, a program, a routine, a set of instructions, and/or a process for performing one or more functions.

The non-transitory computer-readable recording medium may include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices specially configured to store and perform a program instruction (for example, e.g., programming module), such as a Read Only Memory (ROM), a Random Access Memory (RAM), a flash memory and the like. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present disclosure, and vice versa.

Further, the computer-readable recording medium may be distributed over the computer systems connected via network to store and execute a code readable by the computer in a distributed manner. In addition, a functional program, a code, code segments for implementing an embodiment of the present disclosure may be easily deduced by programmers skilled in the art.

In this disclosure, a "computer system" or a computing system is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system can include one or more computers coupled via a network.

Similarly, a computing system may be implemented as a single physical apparatus in which internal modules such as a memory and a processor operate together with the execution of electronic data.

In the beacon service system according to this invention, a device or apparatus, e.g., the user device 100 or the beacon service apparatus 400, for providing a beacon-based payment service may be implemented to perform the above-discussed embodiments based on a computing system to be described hereinafter.

Figure 11:
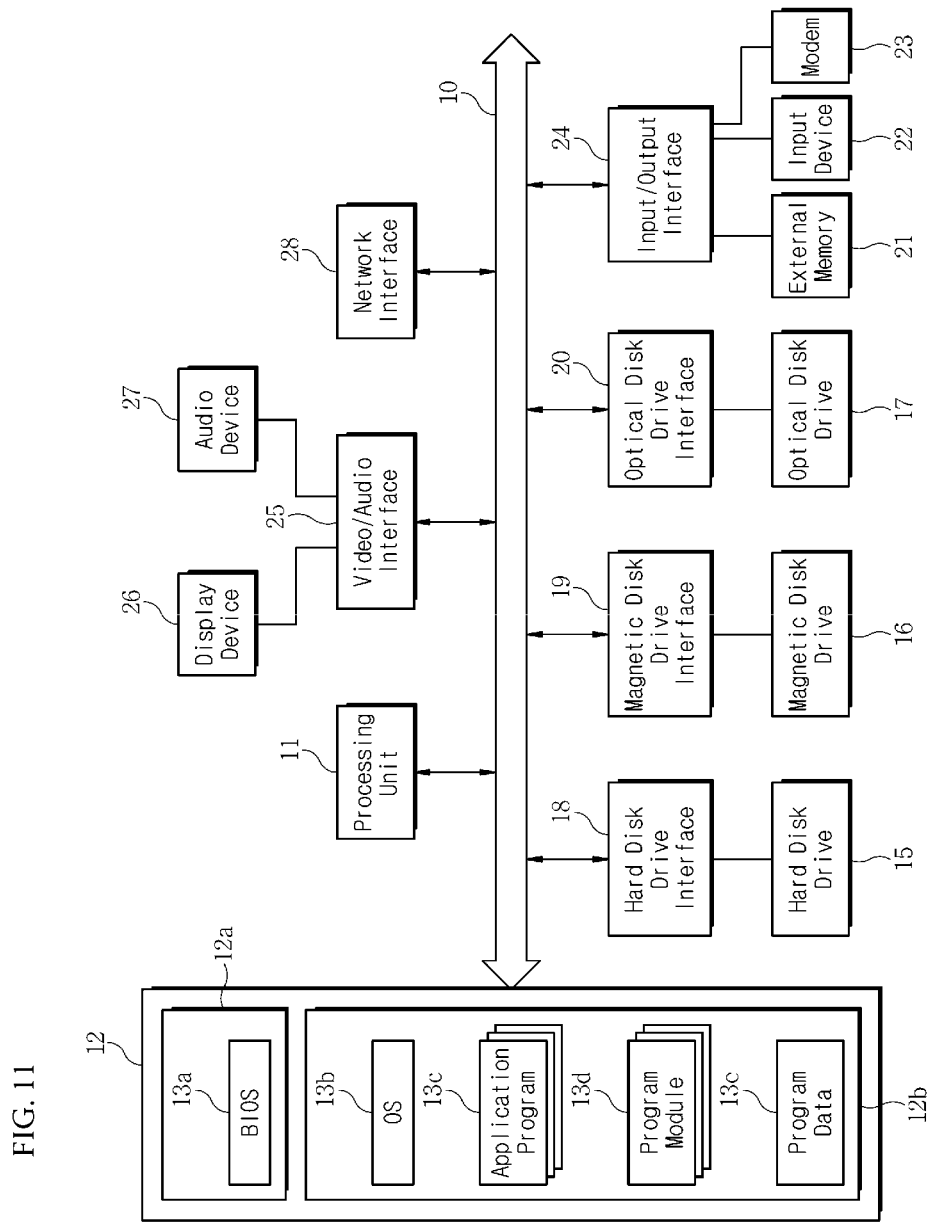
FIG. 11 is a block diagram illustrating an operating environment of an apparatus for providing a beacon-based payment service in a beacon service system according to an embodiment of the present invention.

FIG. 11 is a block diagram illustrating an operating environment of an apparatus for providing a beacon-based payment service in a beacon service system according to an embodiment of the present invention.

FIG. 11 and the following discussion are intended to provide a brief, general description of an example suitable computing environment in which the invention may be implemented. Although not required (e.g., when implemented in hardware), the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

Referring to FIG. 11, an exemplary computing system for implementing the invention includes a processing unit 11, a system memory 12, and a system bus 10 that couples various system components including the system memory 12 to the processing unit 11.

The processing unit 11 can execute computer-executable instructions designed to implement features of this invention.

The system bus 10 may be any of several, types of bus structures including a memory bus or memory controller, a peripheral bus, and a local bus using any of a variety of bus architectures. The system memory 12 includes read only memory (ROM) 12a and random access memory (RAM) 12b. A basic input/output system (BIOS) 13a, containing the basic routines that help transfer information between elements within computer system, such as during start-up, may be stored in the ROM 12a.

The computing system may also include a storage unit, e.g., a hard disk drive 15 for reading from and writing to a hard disk, a magnetic disk drive 16 for reading from or writing to a magnetic disk, and an optical disk drive 17 for reading from or writing to an optical disk such as a CD-ROM or other optical media. The hard disk drive 15, the magnetic disk drive 16, and the optical disk drive 17 are connected to the system bus 10 by a hard disk drive interface 18, a magnetic disk drive-interface 19, and an optical drive interface 20, respectively.

Additionally, the computing system may further include an external memory 21 as the storage unit. The external memory 21 may be connected to the system bus 10 through an input/output interface 24.

The drives and their associated computer-readable media provide nonvolatile storage of computer-executable instructions, data structures, program modules, and other data for the computing system. Although the example environment described herein employs the hard disk 15, the magnetic disk 16 and the optical disk 17, other types of computer readable media for storing data can be used, including magnetic cassettes, flash memory cards, digital versatile disks, Bernoulli cartridges, RAMs, ROMs, and the like.

Program code means including one or more program modules, such as an operating system 13b, one or more application programs 13c, other program modules 13d, and program data 13e, may be stored on the hard disk 15, the magnetic disk 16, the optical disk 17, the ROM 12a, or the RAM 12b.

A user may enter commands and information into the computing system through other input device 22 such as a keyboard, a pointing device, a microphone, a joy stick, a game pad, or the like. This other input device 22 can be connected to the processing unit 11 through the input/output interface 24 coupled to the system bus 10. The input/output interface 24 may logically represent any of a wide variety of different interfaces, such as, for example, a serial port interface, a PS/2 interface, a parallel port interface, a universal serial bus (USB) interface, or an institute of electrical and electronics engineers (IEEE) 1394 interface (i.e., a FireWire interface), or may even logically represent a combination of different interfaces.

Additionally, the computing system may further include a display device 26 such as a monitor or LCD and/or an audio device 27 such as a speaker or a microphone, which are connected to the system bus 10 via a video/audio interface 25. The video/audio interface 25 may include high definition multimedia interface (HDMI), graphics device interface (GDI), or the like.

The computing system is connectable to networks, such as, for example, an office-wide or enterprise-wide computer network, a home network, an intranet, and/or the Internet. The computing system can exchange data with external sources, such as, for example, remote computer systems, remote applications, and/or remote databases over such networks.

The computing system includes a network interface 27, through which the computing system receives data from external sources and/or transmits data to external sources.

The network interface 27 facilitates the exchange of data with remote devices. The network interface 27 can logically represent one or more software and/or hardware modules, such as, for example, a network interface card and corresponding network driver interface specification (NDIS) stack.

Likewise, the computing system receives and/or transmits data from and/or to external sources through the input/output interface 24. The input/output interface 24 is coupled to a modem 23 (e.g., a standard modem, a cable modem, or a digital subscriber line (DSL) modem), through which the computing system receives data from and/or transmits data to external sources.

While FIG. 11 represents a suitable operating environment for the present invention, the principles of the present invention may be employed in any system that is capable of, with suitable modification if necessary, implementing the principles of the present invention. The environment illustrated in FIG. 11 is illustrative only and by no means represents even a small portion of the wide variety of environments in which the principles of the present invention may be implemented.

Various kinds of information generated during the execution of a beacon-based payment service at the beacon service system of this invention may be stored and accessed from any of the computer-readable media associated with the computing system as shown in FIG. 11. For example, portions of such modules and portions of associated program data may be included in the operating system 13b, the application programs 13c, the program modules 13d and/or the program data 13e, for storage in the system memory 12.

When a mass storage device such as the hard disk is coupled to the computing system, such modules and associated program data may also be stored in the mass storage device. In a networked environment, program modules depicted relative to the computing system, or portions thereof, can be stored in a remote computer system connected through the modem 23 or network interface 25 of the input/output interface 24. Execution of such modules may be performed in a distributed environment as previously described.

While the specification contains many specific implementation details, these should not be construed as limitations on the scope of any disclosure or of what may be claimed, but rather as descriptions of features that may be specific to particular embodiments of particular disclosures. Certain features that are described in the specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Also, although the present specifications describe that operations are performed in a predetermined order with reference to a drawing, it should not be construed that the operations are required to be performed sequentially or in the predetermined order, which is illustrated to obtain a preferable result, or that all of the illustrated operations are required to be performed. In some cases, multi-tasking and parallel processing may be advantageous. Also, it should not be construed that the division of various system components are required in all types of implementation. It should be understood that the described program components and systems are generally integrated as a single software product or packaged into a multiple-software product.

While this disclosure has been particularly shown and described with reference to an exemplary embodiment thereof, it will be understood by those skilled in the art that various changes in form and details may be made therein without departing from the spirit and scope of this disclosure as defined by the appended claims.

What is claimed is:

1. A beacon service apparatus comprising:
   a signature pad comprising:
      an input module configured to receive a user input for triggering a beacon-based payment service, and
      a beacon module configured to emit the beacon signal with selected strength; and
   a point of sale (POS) terminal comprising:
      a memory unit configured to store initial strength of a beacon signal and stepwise increased strength of the beacon signal, the initial strength of the beacon signal is of a predetermined strength enabling detection of the beacon signal within a predetermined distance from the beacon module, and
      a processor configured to:
         identify the initial strength of the beacon signal from the memory unit responsive to receiving the user input for triggering the beacon-based payment service from the input module,
         control the beacon module to emit the beacon signal with the identified initial strength toward a user device,
         determine whether a notification is received from a beacon service server, the notification indicating that the user device accessed payment-related content in the beacon service server based on the beacon signal,
         identify the increased strength of the beacon signal from the memory unit responsive to the notification not being received from the beacon service server for a given time after the beacon signal is emitted with the initial strength, and
         control the beacon module to retransmit the beacon signal with the increased strength.

2. A method implemented by a beacon service apparatus, the method comprising steps of:
   receiving, by a signature pad, a user input for triggering a beacon-based payment service;
   identifying stored initial strength of a beacon signal, the initial strength of the beacon signal is of a predetermined strength enabling detection of the beacon signal within a predetermined distance from the beacon service apparatus;
   emitting, by the beacon service apparatus, the beacon signal with the identified initial strength to a user device;
   determining whether a notification is received from a beacon service server, the notification indicating that the user device accessed payment-related content;
   identifying increased strength of the beacon signal responsive to the notification not being received from the beacon service server for a given time after the beacon signal is emitted with the initial strength, the increased strength being higher than the initial strength by a predetermined value; and
   retransmitting the beacon signal with the increased strength.

* * * * *